Nov. 11, 1958     D. H. BAKER ET AL     2,860,237
CELLULAR DIFFUSION PANEL
Filed July 11, 1956     3 Sheets-Sheet 1
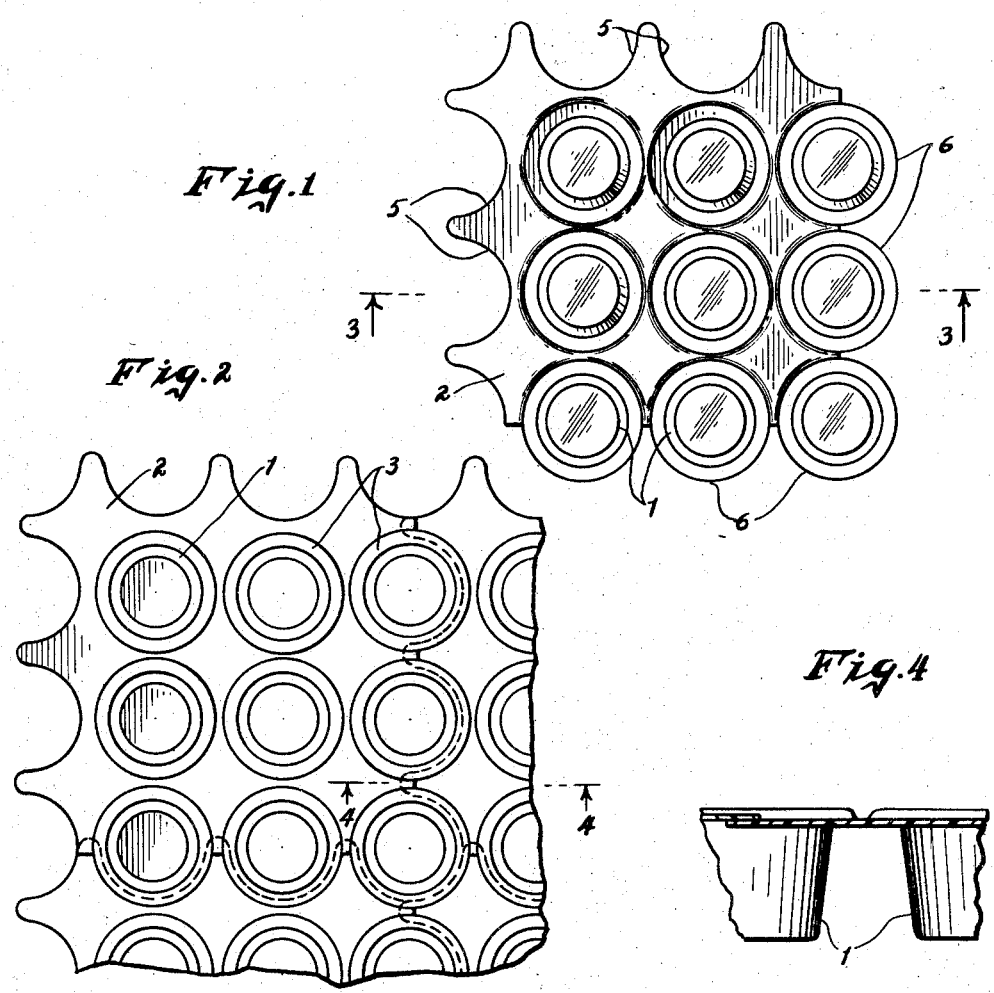
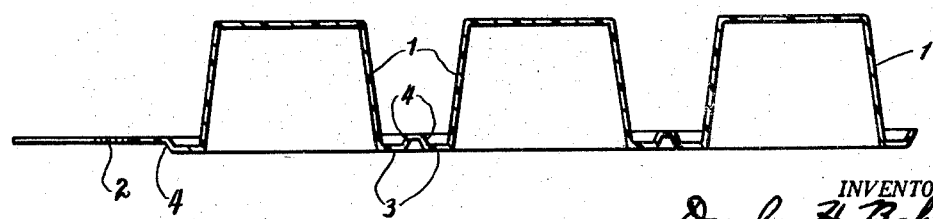
INVENTOR.
Douglas H. Baker
BY
ATTORNEYS Nov. 11, 1958     D. H. BAKER ET AL     2,860,237
CELLULAR DIFFUSION PANEL Filed July 11, 1956     3 Sheets-Sheet 2

INVENTOR.
Douglas H. Baker
BY Guido Barbieri
Emery, Whittemore, Sandoe & Dye
ATTORNEYS Nov. 11, 1958 D. H. BAKER ET AL 2,860,237
CELLULAR DIFFUSION PANEL
Filed July 11, 1956 3 Sheets-Sheet 3

INVENTOR.
Douglas H. Baker
BY
ATTORNEYS

2,860,237
CELLULAR DIFFUSION PANEL

Douglas H. Baker, Florham Park, and Guido Barbieri, Cranford, N. J., assignors to Cell Ceiling Incorporated, New York, N. Y., a corporation of New York Application July 11, 1956, Serial No. 597,256

9 Claims. (Cl. 240—78)

This invention relates to cellular diffusion panels such as are commonly interposed between a source of illumination and an area to be illuminated in order to diffuse the illumination and to avoid glare and shadows. Such panels are now widely used in room illumination, particularly in cases where the source of illumination is a series of fluorescent tubes. The electric fixtures carrying the sources of illumination are usually mounted on the ceiling of the room and the diffusion panel or panels are suspended from the ceiling in spaced relation thereto, so as to be interposed between the source and the room area to be illuminated.

It is an object of the present invention to provide a cellular diffusion panel which is light in weight, inexpensive to manufacture, and which has excellent diffusion characteristics.

It is a further object of the invention to provide a panel of relatively small dimensions which can readily be installed in abutting relationship with other similar panels to cover large ceiling areas, and in which the panels are so constructed that the joints between adjacent panel sections are virtually indistinguishable. As a result a paneled area consisting of a large number of separately fabricated panel sections has the appearance of a single continuous panel of large area.

Other objects and advantages of the invention will appear hereinafter.

A preferred embodiment of the invention selected for purposes of illustration is shown in the accompanying drawings, in which, Figure 1 is a top plan view of a single panel.

Figure 2 is a bottom plan view illustrating the manner in which adjacent panels are joined.

Figure 3 is a section on the line 3—3 of Figure 1.

Figure 4 is a section on the line 4—4 of Figure 2.

Figure 5:
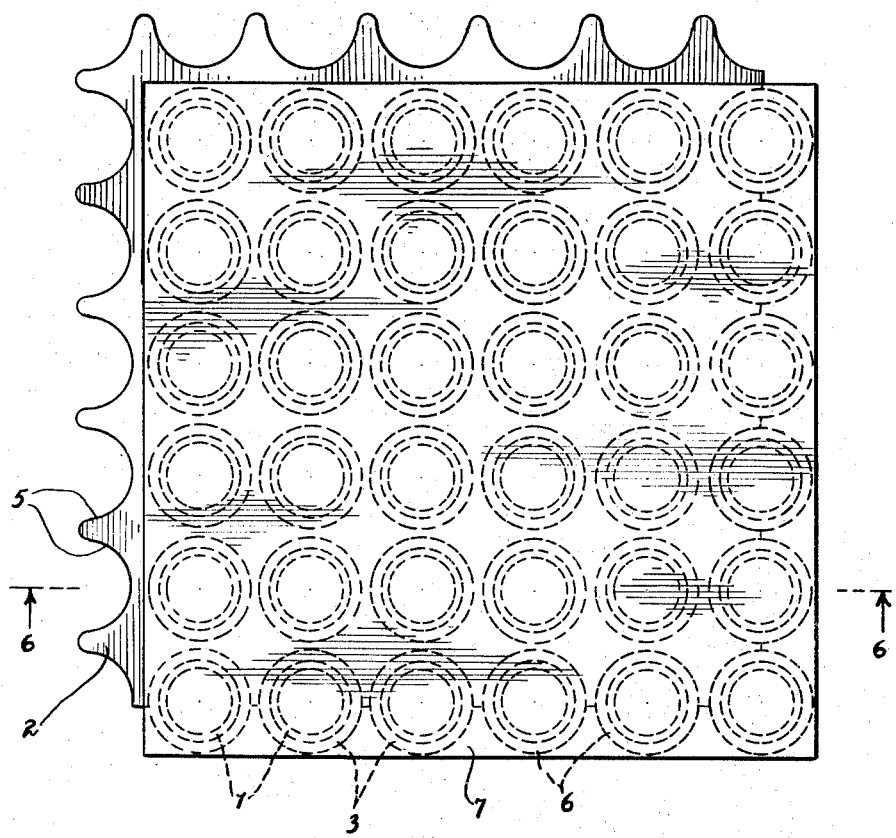
Figure 5 is a top plan view of a larger single panel provided with a backing sheet.

In the drawings, the thickness of the material has been exaggerated somewhat for clarity in illustration.

Referring to the drawings, the panel comprises a multiplicity of cellular elements 1 carried by a supporting sheet 2. In the preferred embodiment illustrated said cellular elements are formed integrally with said supporting sheet, the sheet and cellular elements being preferably formed of translucent plastic material such as polyethylene or vinyl chloride, for example, in a single molding operation.

In an application filed of even date herewith by Guido Barbieri, Serial No. 597,105, filed July 11, 1956 and now abandoned a cellular diffusion panel is described and claimed in which the cellular elements are tubular in shape, circular in cross section, and are arranged with their axes parallel to each other and perpendicular to the plane of the panel. We prefer to use such tubular cellular elements in practicing the present invention because of their important advantages, and have illustrated the invention as embodying such tubular elements, although it will be understood that other shapes may be used, if desired.

According to the present invention, the tubular cellular elements extend through the plane of the supporting sheet and terminate in raised rims 3 which are offset from the plane of the supporting sheet, being spaced outwardly therefrom, with one of said raised rims surrounding each of the cellular elements. The outside edges of said raised rims are joined to the supporting sheet by short connecting webs 4.

In the embodiment illustrated, the tubular cellular elements are in the form of hollow truncated cones, although it will be understood that other circular shapes may be employed.

The raised rims not only enhance the appearance of the panel, but they serve an important function in making it possible to join adjacent panels in abutting relationship without an objectionable joint line, as hereinafter explained.

The panels may be made in any convenient size, but for purposes of illustration herein, an individual panel is shown as comprising nine equidistantly spaced tubular elements, arranged in three parallel rows of three.

In order to provide for joining adjacent panels in abutting relationship without an objectionable joint line, each panel is provided with scalloped edges. Thus, in two of the side edges the scalloped edges are formed by a series of semi-circular, concave indentations 5. The center of each of the indentations is aligned with the centers of the tubular elements of an adjacent row of tubular elements, and the center of each indentation is spaced from the center of the next adjacent tubular element by a distance equal to the spacing between centers of adjacent tubular elements. The diameter of the indentations is greater than the diameter of the tubular elements, but less than the outside diameter of the raised rims thereof.

In the other two side edges of the supporting sheet, the scalloped edges are formed by a series of semi-circular convex projections 6. The center of each of the convex projections coincides with the center of a tubular element. The diameter of the projections is preferably not less than the outside diameter of the raised rims 3. In the embodiment illustrated the diameter of the projections is equal to the diameter of the raised rims at the point at which the connecting webs 4 meet and join the supporting sheet.

Thus, when a series of panels are assembled as shown in Fig. 3, the concave indentations of one panel encircle the tubular elements along the edge of an adjacent panel, but lie under and are concealed by the raised rims of the respective tubular elements. When the panels are made of relatively thin translucent plastic material such as polyethylene, the joint is virtually unnoticeable.

Figure 6:
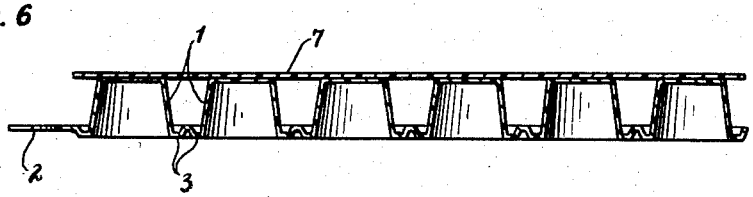
Figure 6 is a section on the line 6—6 of Figure 5.
Figure 7:
Figure 7 is a fragmentary section showing the manner in which adjacent panels meet.

If desired, the panel may be reinforced and stiffened by a backing sheet 7, as shown in Figs. 5 and 6, which may be secured to the free ends of the tubular elements in any suitable manner, as by heat sealing or adhesive. The length and width dimensions of the backing sheet are substantially the same as those of the panel, but for convenience in assembling adjacent panels, the backing sheet is located, as shown in Fig. 5, so that its edges are spaced equidistantly from the centers of the tubular elements along each outside row thereof. When so located, the opposed edges of the backing sheets of adjacent panels will lie in abutting relationship when the panels are assembled as shown in Fig. 7.

Figure 8:
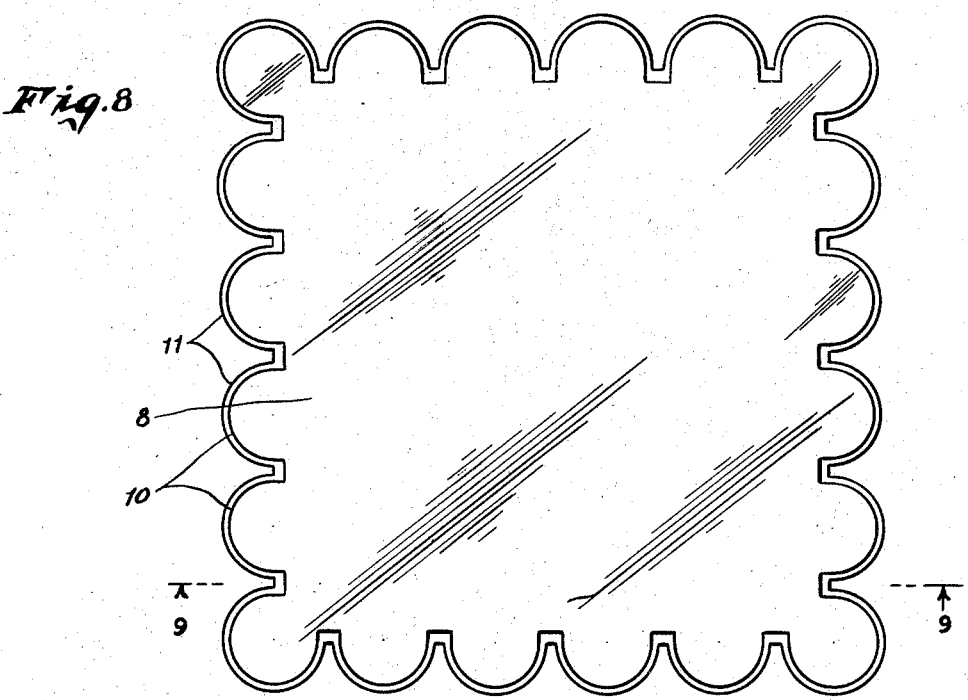
Figure 8 is a top plan view of a single panel provided with a modified form of backing sheet.
Figure 9:
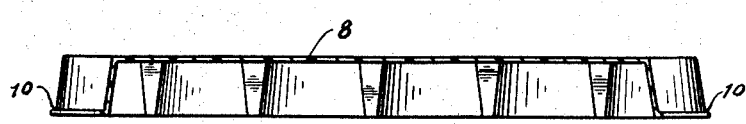
Figure 9 is a section on the line 9—9 of Figure 8.
Figure 10:
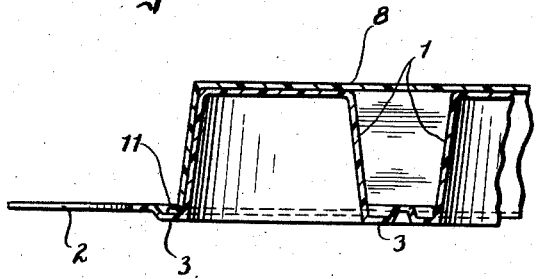
Figure 10 is a fragmentary section showing the backing sheet of Figure 8 mounted on the panel.

An alternative form of backing sheet is shown in Figs. 8, 9 and 10. In this form, the backing sheet 8 is provided with depending, scalloped walls 10 around the periphery of the sheet, said walls terminating in narrow flanges 11. The individual scallops of the scalloped walls are shaped and spaced to fit around the outside tubular elements of the panel and the flanges 11 rest in and are secured to the inside surfaces of the rims 3, preferably by heat sealing.

It will be understood that the invention may be variously modified and embodied within the scope of the subjoined claims.

We claim as our invention:

1. A cellular diffusion panel for interposition between a source of illumination and an area to be illuminated, comprising a supporting sheet of translucent material, a multiplicity of tubular cellular elements of translucent material extending through the plane of said supporting sheet, each said cellular element terminating in a circular raised rim which extends outwardly from and surrounds the element and which is offset from the plane of the supporting sheet and spaced outwardly therefrom, the outside edges of said raised rims being joined to the supporting sheet by short connecting webs, said tubular elements being circular in cross section and having their longitudinal axes parallel to each other and perpendicular to the plane of the panel.

2. A cellular diffusion panel as claimed in claim 1 in which said tubular elements are equidistantly spaced and arranged in rows, and in which at least one edge of said supporting sheet is a scalloped edge formed by a series of semi-circular concave indentations the diameter of said indentations being greater than the diameter of said tubular elements but less than the outside diameter of said raised rims.

3. A cellular diffusion panel as claimed in claim 1 in which said tubular elements are equidistantly spaced and arranged in rows, and in which at least one edge of said supporting sheet is a scalloped edge formed by a series of semi-circular convex projections, the diameter of said projections being not less than the outside diameter of said raised rims.

4. A cellular diffusion panel as claimed in claim 1 in which said tubular elements are equidistantly spaced and arranged in rows, and in which at least one edge of said supporting sheet is a scalloped edge formed by a series of semi-circular concave indentations, the diameter of said indentations being greater than the diameter of said tubular elements but less than the outside diameter of said raised rims, and in which at least one other edge is a scalloped edge formed by a series of semi-circular convex projections, the diameter of said projections being not less than the outside diameter of said raised rims.

5. A cellular diffusion panel as claimed in claim 1 in which said tubular elements are equidistantly spaced and arranged in rows, and in which at least one edge of said supporting sheet is a scalloped edge formed by a series of semi-circular concave indentations, the diameter of said indentations being greater than the diameter of said tubular elements but less than the outside diameter of said raised rims the center of each indentation being aligned with the centers of an adjacent row of tubular elements and spaced from the center of the next adajacent tubular element by a distance equal to the spacing between centers of adjacent tubular elements.

6. A cellular diffusion panel as claimed in claim 1 in which said tubular elements are equidistantly spaced and arranged in rows, and in which at least one edge of said supporting sheet is a scalloped edge formed by a series of semi-circular concave indentations, the center of each indentation being aligned with the centers of an adjacent row of tubular elements and spaced from the center of the next adjacent tubular element by a distance equal to the spacing between centers of adjacent tubular elements, the diameter of said indentations being greater than the diameter of the tubular elements, but less than the outside diameter of said raised rims.

7. A cellular diffusion panel as claimed in claim 1 in which said tubular elements are equidistantly spaced and arranged in rows, and in which at least one edge of said supporting sheet is a scalloped edge formed by a series of semi-circular convex projections, the center of each convex projection coinciding with the center of a tubular element.

8. A cellular diffusion panel as claimed in claim 1 in which said tubular elements are equidistantly spaced and arranged in rows, and in which at least one edge of said supporting sheet is a scalloped edge formed by a series of semi-circular convex projections, the center of each convex projection coinciding with the center of a tubular element, the diameter of said projections being not less than the outside diameter of said raised rims.

9. A cellular diffusion panel as claimed in claim 1 and including a backing sheet, said backing sheet being provided with depending, scalloped walls around its periphery which are shaped and spaced to fit around the outside tubular elements of the panel, said walls terminating in narrow flanges which rest in and are secured to the inside surfaces of said rims.

References Cited in the file of this patent

UNITED STATES PATENTS

| | | |
|---|---|---|
| D. 163,085 | Bishop | May 1, 1951 |
| 2,218,992 | Munroe | Oct. 22, 1940 |
| 2,745,001 | Guth | May 8, 1956 |
| 2,755,882 | Maccaferri | July 24, 1956 |

FOREIGN PATENTS

| | | |
|---|---|---|
| 178,139 | Australia | Apr. 10, 1954 |
| 179,334 | Great Britain | May 11, 1922 |